(12) United States Patent
Davis et al.

(10) Patent No.: US 12,149,527 B2
(45) Date of Patent: *Nov. 19, 2024

(54) METHODS AND SYSTEMS FOR VERIFYING AN IDENTITY OF A USER THROUGH CONTEXTUAL KNOWLEDGE-BASED AUTHENTICATION

(71) Applicant: Capital One Services, LLC, McLean, VA (US)

(72) Inventors: Matt Davis, Arlington, VA (US); Pranav Khanna, Falls Church, VA (US); Paul Melby, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/933,140

(22) Filed: Sep. 19, 2022

(65) Prior Publication Data

US 2023/0008170 A1 Jan. 12, 2023

Related U.S. Application Data

(63) Continuation of application No. 17/010,640, filed on Sep. 2, 2020, now Pat. No. 11,496,465, which is a continuation of application No. 16/845,546, filed on Apr. 10, 2020, now Pat. No. 10,812,478.

(51) Int. Cl.
| | |
|---|---|
| *H04L 29/06* | (2006.01) |
| *G06F 21/31* | (2013.01) |
| *G06F 21/34* | (2013.01) |
| *G06F 21/40* | (2013.01) |
| *G06F 21/42* | (2013.01) |
| *H04L 9/40* | (2022.01) |

(52) U.S. Cl.
CPC .......... *H04L 63/0853* (2013.01); *G06F 21/31* (2013.01); *G06F 21/34* (2013.01); *G06F 21/40* (2013.01); *G06F 21/42* (2013.01)

(58) Field of Classification Search
None
See application file for complete search history.

(56) References Cited

U.S. PATENT DOCUMENTS

| | | | | |
|---|---|---|---|---|
| 11,496,465 | B2* | 11/2022 | Davis | H04L 63/0853 |
| 2009/0276839 | A1* | 11/2009 | Peneder | G06F 21/31 |
| | | | | 726/8 |
| 2014/0324757 | A1* | 10/2014 | Tabrizi | G06F 16/00 |
| | | | | 706/50 |
| 2015/0026796 | A1* | 1/2015 | Alan | G06F 21/31 |
| | | | | 726/19 |
| 2017/0033936 | A1* | 2/2017 | Cidon | H04L 9/3239 |
| 2019/0156302 | A1* | 5/2019 | Tonio | G06Q 20/40 |

* cited by examiner

*Primary Examiner* — Benjamin E Lanier
(74) *Attorney, Agent, or Firm* — Foley & Lardner LLP

(57) ABSTRACT

Methods and systems are described for verifying an identity of a user through contextual knowledge-based authentication. The system described uses contextual knowledge-based authentication. By verifying an identity of a user through contextual knowledge-based authentication, the verification is both more secure and more intuitive to the user. For example, by relying on confidential and/or proprietary information, the system may generate verification questions, the answers to which are known only by the user.

18 Claims, 5 Drawing Sheets

METHODS AND SYSTEMS FOR VERIFYING AN IDENTITY OF A USER THROUGH CONTEXTUAL KNOWLEDGE-BASED AUTHENTICATION

CROSS-REFERENCE TO RELATED APPLICATIONS

This application is a continuation of U.S. patent application Ser. No. 17/010,640, filed Sep. 2, 2020, which is a continuation of U.S. patent application Ser. No. 16/845,546, filed Apr. 10, 2020. The content of each of the foregoing applications is incorporated herein in its entirety by reference.

BACKGROUND INFORMATION

In recent years, the amount and uses of personal data on a given user has increased exponentially. Along with the rise in both the amount and uses for this data, concerns about protecting this data have also increased. While encryption and other typical security measures are available to securely transmit data, users still require an intuitive way of accessing the data. Furthermore, users require an intuitive way of accessing data on multiple devices.

SUMMARY

Methods and systems are described herein for verifying an identity of a user through contextual knowledge-based authentication. For example, users are increasingly accessing secured data from public and/or mobile devices. While various mechanism exists for protecting data such as passwords, tokens, two-factor authorization, each of these systems has a drawback. For example, passwords require a user to remember multiple passwords for each secured account. If a single password is used, the leaking of that password to an unauthorized user may put all of the user's data (across all the user's accounts) at risk. Two-factor authorization, while more secure in some regards, is also more cumbersome and may require a user to have access to a particular device. There is a need therefore for a security mechanism that is both secure and easy for a user to remember without the need for additional devices.

The system described herein solves that need through the use of contextual knowledge-based authentication. By verifying an identity of a user through contextual knowledge-based authentication, the verification is both more secure and more intuitive to the user. For example, by relying on confidential and/or proprietary information, the system may generate verification questions, the answers to which are known only by the user. In addition to relying on proprietary and/or confidential information about a user, the system may verify that this information is not too common or too unique. By doing so, the system ensures that answers to the questions are not easily guessed by an unauthorized person. For example, if the answer is too common, the unauthorized person may easily guess this information (or use an Internet search to determine the answer). If the answer is too unique, the unauthorized person may simply always guess the most unique answer. Accordingly, the system includes techniques for ensuring that verification questions and/or answer relate to private information about a user and does not feature answers that are too common or too unique.

In one aspect, a system for verifying an identity of a user through contextual knowledge-based authentication may comprise one or more processors. The system may receive, from a remote device, a query to generate a first verification question for a user. For example, a user may be logging onto a secured account from a mobile device. The mobile device may request the verification question as a security measure. In response to the query, the system may retrieve a user profile for a user. The user profile may include one or more categories of data about the user.

The system may retrieve a first value for a first scenario from the user profile. For example, the first value may represent a first behavior of the user in the first scenario. The scenario may include such things as the last grocery store a user visited, the last type of purchase the user made, etc. The behavior may include the name of a grocery store the user visited, the type of purchase, etc. For example, by using information retrieved from the user profile, the system may provide questions that are more secure (e.g., questions with answers that are harder to guess) and also intuitive.

The system may compare the first value to a plurality of values for other users. For example, along with information on the user, the system may also access information on other users. This information may include a plurality of values that represent a respective behavior of each of the other users in the first scenario. For example, the information may include such things as the last grocery store each of the plurality of other users visited, the last type of purchase each user made, etc. The system may also have the behavior of each use in that scenario.

The system may determine a first likelihood of the first value with respect to the plurality of values. For example, the system may determine how unusual or how common the behavior of the first user is with respect to other users. The system may then compare the first likelihood to a threshold range of likelihoods. For example, the system may determine how unusual or common a given behavior is. If the behavior is too common or too unusual, the system may exclude the scenario from being used to authenticate a user as values that are too unusual or too common may be too easily guessed by unauthorized users. To ensure that the behavior is not too common or too unusual, the system may compare the value of the user to a range of thresholds.

In response to determining that the first likelihood is within the threshold range of likelihoods, the system may generate the first verification question for the user based on the first value. For example, in response determining that the behavior of the user is suitable for use in verifying an identity of a user through contextual knowledge-based authentication, the system may select the first value (and the first scenario) for use in generating a verification question. This verification question may include a multiple-choice question, a ranking question, and/or any other suitable type of question. The system may then transmit the first verification question for display on the remote device. The system may further receive, from the remote device, a user submission in response to the first verification question and verify the user submission based on the first value.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DESCRIPTION OF THE EMBODIMENTS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
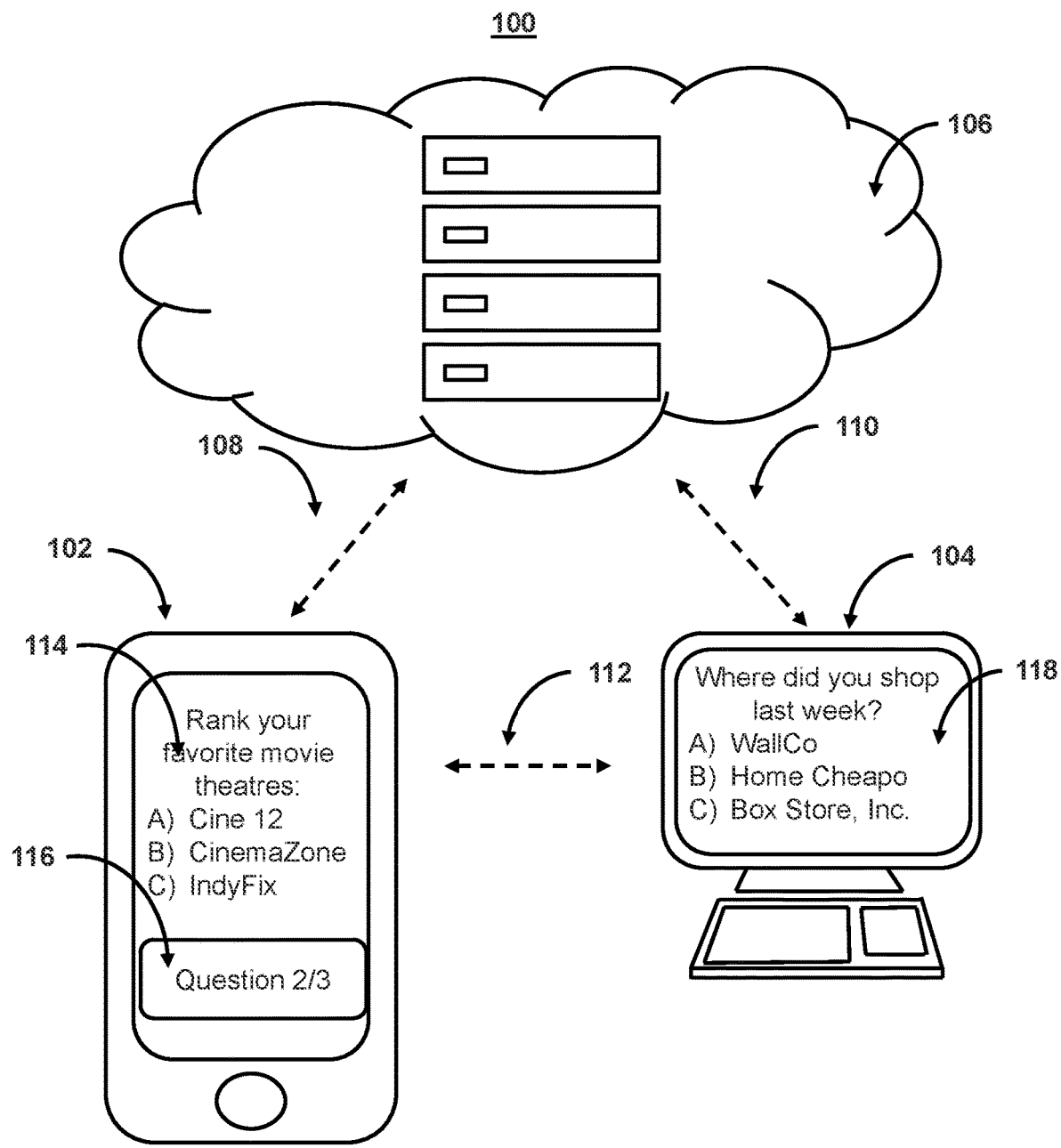
FIG. 1 shows an illustrative system for verifying an identity of a user through contextual knowledge-based authentication, in accordance with one or more embodiments.

FIG. 1 shows an illustrative system for verifying an identity of a user through contextual knowledge-based authentication, in accordance with one or more embodiments. As shown in FIG. 1, system 100 may include mobile device 102 and user terminal 104. While shown as a smartphone and personal computer, respectively, in FIG. 1, it should be noted that mobile device 102 and user terminal 104 may be any computing device, including, but not limited to, a laptop computer, a tablet computer, a hand-held computer, other computer equipment (e.g., a server), including "smart," wireless, wearable, and/or mobile devices. FIG. 1 also includes server 106. Server 106 may alternatively be any computing device as described above and may include any type of mobile terminal, fixed terminal, or other device. For example, server 106 may be implemented as a cloud computing system and may feature one or more component devices. It should also be noted that system 100 is not limited to three devices. Users may, for instance, utilize one or more other devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of mobile device 102, those operations may, in some embodiments, be performed by components of server 106. In some embodiments, the various computers and systems described herein may include one or more computing devices that are programmed to perform the described functions. Additionally or alternatively, multiple users may interact with system 100 and/or one or more components of system 100. For example, in one embodiment, a first user (e.g., a customer) and a second user (e.g., a customer service agent) may interact with system 100 (e.g., a second user may read questions to the first user and the second user may enter inputs based on the responses of the first user) using two different components.

With respect to the components of mobile device 102, user terminal 104, and server 106, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing circuitry. Each of these devices may also include a user input interface and/or user output interface (e.g., a display) for use in receiving and displaying data. For example, as shown in FIG. 1, both mobile device 102 and user terminal 104 include a display upon which to display data. Additionally, as mobile device 102 and user terminal 104 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to verifying an identity of a user through contextual knowledge-based authentication (e.g., either transmitting verification requests, receiving verification requests, and/or processing verification requests). For example, the processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 1 also includes communication paths 108, 110, and 112. Communication paths 108, 110, and 112 may include the Internet, a mobile phone network, a mobile voice or data network (e.g., a 4G or LTE network), a cable network, a public switched telephone network, or other types of communications network or combinations of communications networks. Communication paths 108, 110, and 112 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Server 106 may be a database configured to store user data for a user. For example, the database may include user data that the system has collected about the user through prior transactions. Alternatively or additionally, the system may act as a clearing house for multiple sources of information about the user. Server 106 may also include control circuitry configured to perform the various operations needed to verify an identity of a user through contextual knowledge-based authentication. For example, server 106 may receive, from mobile device 102 or user terminal 104, an authentication request for a user.

In some embodiments, a request to verify an identity of a user through contextual knowledge-based authentication may be structured as an API request that includes a URL, body, and method. The API request may correspond to one half of the API request-response cycle between one or more devices and/or applications to complete the request. For example, the system (e.g., mobile device 102 and server 106) may communicate in HTTP (Hyper Text Transfer Protocol) through a request-response cycle. To make a valid request, the requester (e.g., mobile device 102) may include a URL (Uniform Resource Locator), method, list of headers, and/or body. The URL may indicate to the verification service what resources to use (e.g., "VerficiationQuestion-Application"). The body may contain headers and data. The headers may provide metadata about the request (e.g., the name of the requester, the user account for which access is needed, etc.) and the body may indicate the name of the user for which contextual knowledge-based authentication is needed.

FIG. 1 shows the system for verifying an identity of a user through contextual knowledge-based authentication. One component may be an application running on a mobile device of a user (e.g., mobile device 102). Using this component, the system may provide an authentication service for a user that allows the user to quickly and easily gain access to his/her data stored on a remote system (e.g., server 106). The system may allow a user to enter user-provided data and/or respond to one or more questions generated based on contextual knowledge of the user (e.g., as question 114). Through the user of the application, the system may allow a user to transmit an authentication request using mobile device 102. In response to receiving the authentication request, the authentication service (e.g., located at server 106) may process the request and initiate a contextual knowledge-based authentication (e.g., by presenting question 114) in order to allow the user to quickly and easily be authenticated. The system may further provide one or more questions and indicate such to the user (e.g., via icon 116).

Another component of the system shown in FIG. 1 is user terminal 104. Similar to the user of mobile device 102, the system may allow a requestor to verify an identity of a user through contextual knowledge-based authentication by responding to an authentication request (e.g., question 118) to the authentication service located at server 106.

During contextual knowledge-based authentication the system may use multiple naming conventions, format, and value types of a category, scenario, value, etc. and these may differ from that of the user profile data (as stored at server 106), server 106 may use matching algorithms that may support exact match techniques and/or partial or "fuzzy" matching logic (e.g., searching for a closest match) to locate alternate spellings, naming conventions, etc. for user data. For example, a column name associated with user data may be compared to a required category and/or scenario for the authentication. Based on the degree of similarity between the headings a "similarity rating" may be assigned using any suitable algorithm or weighting logic.

For example, a system, application and/or non-transitory computer-readable media for verifying an identity of a user through contextual knowledge-based authentication may reside on server 106. The system may receive, from a remote device (e.g., mobile device 102), a query to generate a first verification question for a user (e.g., question 114 or 118). The question may include numerous formats including dichotomous, multiple choice, rank order, text slider, and/or other types of questions that use audio, graphical, and/or video cues. For example, a question may include a map through which a user must select a recently visited location (e.g., a grocery store recently used).

The system may modify the difficulty and number of questions based on the identity of the requesting device, user, previously stored user settings, and/or the data or data type for which access is needed. For example, data that include financial or personally identifiable information may have a higher difficultly or higher number of questions. In some embodiments, the difficulty of a question is based on the likelihood that other users share an answer for the question. For example, the system may determine a probability density function of a value corresponding to a user and determine how likely it is that that value appears. In another example, the system may determine the number of different values or the number of possible outcomes. The system may then determine a threshold based on the number of different values or the number of possible outcomes. That is, the system may determine a statistical probability that a given outcome (e.g., an answer to a verification) may occur. In some embodiments, the system may increase the number of questions required in order to meet a particular threshold statistical probability.

In response to the query, the system may retrieve a user profile for a user. The user profile may include data that is actively or passively compiled on a user. For example, the data may include demographic, geographic, and/or financial data on the user. The data may indicate the preferences, tastes, habits, and/or recent activities of the user (e.g., recent purchases). The user profile may comprise a digital representation of the user. This representation may be organized into scenarios and behaviors of the user in the scenario. The scenario may include any information about an event, course of action, or other circumstance related to the user. For example, the scenario may include where a user last shopped, where the user normally shows, what items were purchases, etc. The profile may also include a behavior for the user in the given scenario (e.g., the manner, way, characteristics, and/or any other information about the user's conduct in the scenario). The profile may also include one or more categories in which the user falls. These categories may be used by the system to select other users to compare to the user. The categories may include any information that distinguishes one user from another or from a group of users.

The user profile may include data of various types and from various sources. For example, the user profile may include data on credit/debit card purchases, purchasing trends (e.g., where the user spends, what the user buys, how much the user spends), phone call interactions (e.g., how often a user calls, the number called, and the number called from), digital engagement history of the user (e.g., does the user use a mobile app, what devices does the user use, when and how often does the user log in), text/chat history, map and global positioning data (e.g., where the user is located, where the user has been located in the past, areas frequented by a user, distances traveled by a user).

The system may record the scenarios, behaviors, and user profiles as records in a database. The records may include fields with particular values corresponding to given behaviors. For example, a value for a behavior related to a shopping scenario may indicate what, how much, or where a user purchased a good or service. In some embodiments, the system may store alphanumeric values (e.g., describing a product that was purchased). For example, a value may in some embodiments include any quantitative or qualitative measure of the behavior of a user in a given scenario.

The system may retrieve a first value for a first scenario from the user profile, wherein the first value represents a first behavior of the user in the first scenario. The system may then compare the first value to a plurality of values for other users, wherein the plurality of values represents a respective behavior of each of the other users in the first scenario. For example, in addition to storing information on the user, the system may store information on other users. This information may be confidential and/or proprietary to the system. Alternatively or additionally, the system may aggregate data from multiple other private and public sources.

The system may then determine a first likelihood of the first value with respect to the plurality of values. For example, the system may determine how likely the first value is with respect to the values for other users. The system may then compare the first likelihood to a threshold range of likelihoods. For example, the system may ensure that the likelihood is not too high or too low. For example, a high likelihood may make a question easy to guess by an unauthorized user. A low likelihood may also make a question easy to guess by an unauthorized user because the answer to the question respects such an outlier.

In response to determining that the first likelihood is within the threshold range of likelihoods, the system may generate the first verification question for the user based on the first value. For example, if the first value represents a location of a grocery store, the system may generate a question requiring a user to identify the grocery store on a map. In another example, if the value represents an amount spent at the grocery store, the system may generate a question asking the user to enter the amount spent. In another example, if the value indicates how often the user visits the grocery store, the system may generate a question that require the user to rank the frequency at which the user visits different locations, with the grocery store being one of the locations.

In some embodiments, the system may determine a value of the user that has a low likelihood compared to other users and select the corresponding scenario for generating a question. For example, the system may analyze the purchase history of the user for atypical purchases. In response to finding an atypical purchase, the system may generate a question based on the purchase (or value associated with the purchase). For example, if the system determines that most users in a given zip code frequent the same restaurant, the system will not generate a question based on a corresponding scenario.

The system may then transmit the first verification question for display on the remote device (e.g., mobile device 102). The system may then receive, from the remote device, a user submission in response to the first verification question. The system may then verify the user submission based on the first value.

Figure 2:
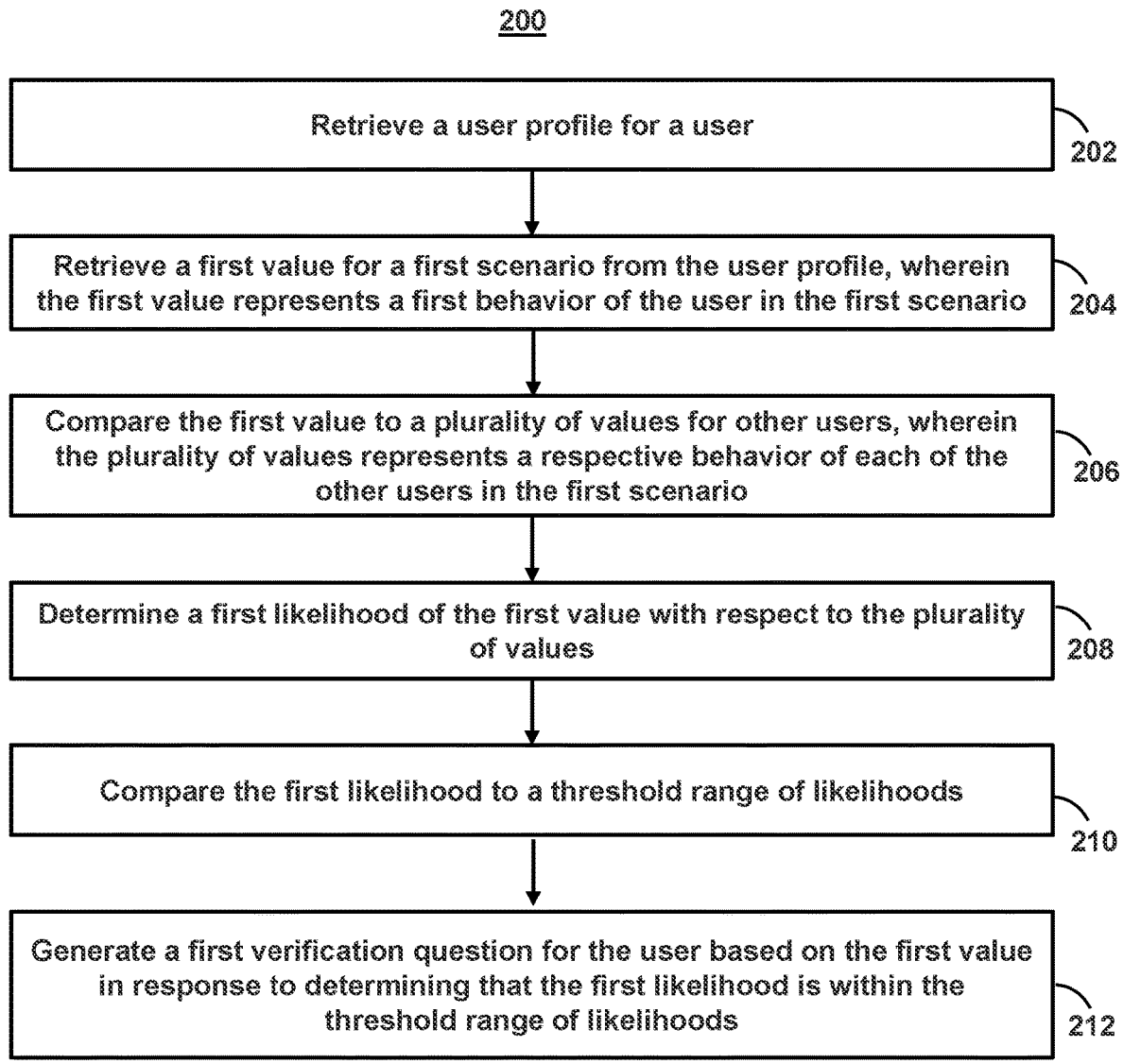
FIG. 2 shows a flowchart of the steps involved in verifying an identity of a user through contextual knowledge-based authentication, in accordance with one or more embodiments.

FIG. 2 shows a flowchart of the steps involved in verifying an identity of a user through contextual knowledge-based authentication, in accordance with one or more embodiments. For example, process 200 may represent the steps taken by one or more devices as shown in FIG. 1 to verify an identity of a user through contextual knowledge-based authentication.

At step 202, process 200 retrieves (e.g., by control circuitry of one or more of the devices in FIG. 1) a user profile for a user. For example, the system may receive, from a remote device (e.g., mobile device 102 (FIG. 2)), a query to generate a first verification question for a user. In response to the query, the system may retrieve the user profile for a user.

At step 204, process 200 retrieves (e.g., by control circuitry of one or more of the devices in FIG. 1) a first value for a first scenario from the user profile, wherein the first value represents a first behavior of the user in the first scenario. For example, the first scenario may correspond to a communication type with a given entity. The first behavior may correspond to whether or not the user has used a chat feature to communicated with the given entity. The system may normalize the behaviors into a series of numerical values. For example, one may correspond to communication via telephone, two may correspond to communication via chat/text, and three may correspond to communication via an in-person conference.

At step 206, process 200 compares (e.g., by control circuitry of one or more of the devices in FIG. 1) the first value to a plurality of values for other users, wherein the plurality of values represents a respective behavior of each of the other users in the first scenario. For example, the system may select a contextual knowledge-based authentication question on information about other users. For example, the system may use information about other users to ensure that the answer to contextual knowledge-based authentication questions are atypical and/or not easily guessed.

At step 208, process 200 determines (e.g., by control circuitry of one or more of the devices in FIG. 1) a first likelihood of the first value with respect to the plurality of values. For example, the system may use one or more techniques to determine the likelihood of the first value with respect to the plurality of values. This may involve determining that the first value is not an average value, a mode value, and/or not with a given probability percentage.

At step 210, process 200 compares (e.g., by control circuitry of one or more of the devices in FIG. 1) the first likelihood to a threshold range of likelihoods. For example, the system may determine a log likelihood or other probability statistic and ensure that the likelihood is within a certain percentage of probability (e.g., five, ten, or fifteen percent).

At step 212, process 200 generates (e.g., by control circuitry of one or more of the devices in FIG. 1) a first verification question for the user based on the first value in response to determining that the first likelihood is within the threshold range of likelihoods. For example, the system may additionally transmit the first verification question (e.g., question 114 (FIG. 1)) for display on the remote device (e.g., mobile device 102 (FIG. 1)). The system may then receive, from the remote device, a user submission in response to the first verification question. The system may then verify the user submission based on the first value.

It is contemplated that the steps or descriptions of FIG. 2 may be used with any other embodiment of this disclosure. In addition, the steps and descriptions described in relation to FIG. 2 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one or more of the steps in FIG. 2.

Figure 3:
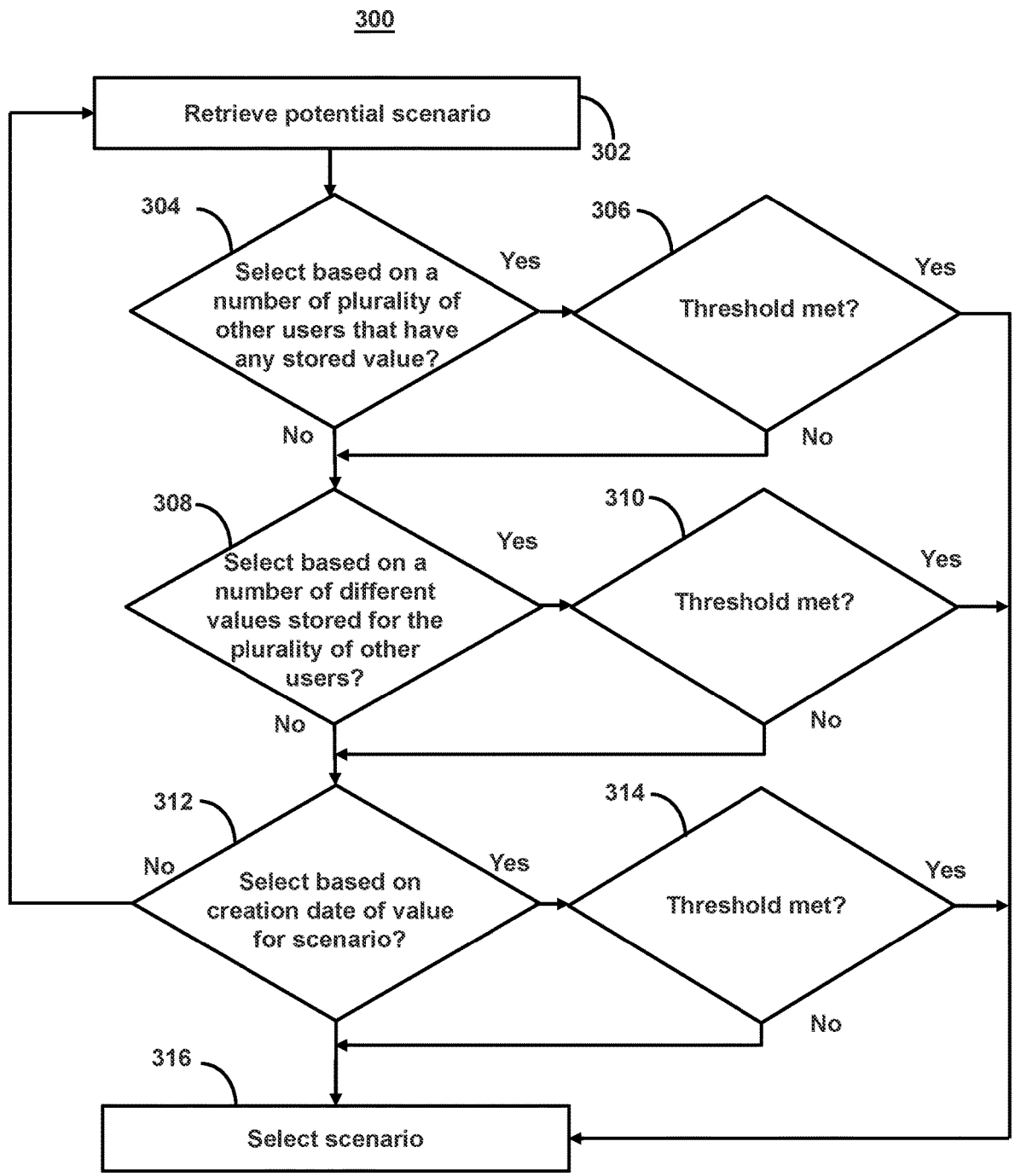
FIG. 3 shows a flowchart of the steps involved in selecting a scenario for use in contextual knowledge-based authentication, in accordance with one or more embodiments.

FIG. 3 shows a flowchart of the steps involved in selecting a scenario for use in contextual knowledge-based authentication, in accordance with one or more embodiments. For example, process 300 may represent the steps taken by one or more devices as shown in FIG. 1 when selecting a scenario to use to generate a question for use in contextual knowledge-based authentication.

At step 302, process 300 retrieves (e.g., by control circuitry of one or more of the devices in FIG. 1) a potential scenario. For example, the system may user one or more criteria to determine a given scenario to use as basis for a verification question. The system may further select the criteria dynamically or may have a predetermined criterion (e.g., based on a user setting and/or industry standard). The criteria may vary. For example, the selection may be based on the requests coming from a specific device, being about specific users, being for specific information about a user, or being for information about the user from a particular source. Furthermore, the system may also select thresholds dynamically or according to predetermined criteria as well.

At step 304, process 300 determines (e.g., by control circuitry of one or more of the devices in FIG. 1) whether or not to select a scenario based on a number of plurality of other users that have any stored value. For example, the system may determine whether or not there is a threshold amount of other users that have any value (e.g., a number of visits per week to the grocery store) for a given scenario (e.g., visits per week to the grocery store). For example, the system may only select scenarios in which there is a particular number of users that correspond to the scenario. For example, the system may retrieve respective user profiles for a plurality of other users. The system may then determine a number of the plurality of other users that have any stored value for the first scenario.

If process 300 determines not to select a scenario based on a number of plurality of other users that have any stored value, process 300 proceeds to step 308. If process 300 determines select a scenario based on a number of plurality of other users that have any stored value, the system proceeds to step 306 and determines whether or not the threshold is met. If the threshold is met, process 300 proceeds to step 316 and selects the scenario. If the threshold is not met, process 300 proceeds to step 308. For example, the system may compare the number to a threshold number for the plurality of other users. The system may select the first scenario in response to determining that the number is within the threshold number.

At step 308, process 300 determines (e.g., by control circuitry of one or more of the devices in FIG. 1) whether or not to select a scenario based on a number of different values stored for the plurality of other users. For example, the system may determine whether or not there is a threshold amount of different potential answers (or answers corresponding to different users) for a given scenario. For example, the system may only select scenarios in which a particular number of potential values for different users are available (e.g., if the true number of different answers, e.g., those not corresponding to any other user, may exist). For example, the system may retrieve respective user profiles for a plurality of other users. The system may then determine a number of the plurality of other users that have any stored value for the first scenario.

If process 300 determines not to select a scenario based on a number of different values stored for the plurality of other users, process 300 proceeds to step 312. If process 300 determines to select a scenario based on a number of different values stored for the plurality of other users, the system proceeds to step 310 and determines whether or not the threshold is met. If the threshold is met, process 300 proceeds to step 316 and selects the scenario. If the threshold is not met, process 300 proceeds to step 312. For example, the system may compare the number to a threshold number for the plurality of other users. The system may then select the first scenario in response to determining that the number is within the threshold number.

At step 312, process 300 determines (e.g., by control circuitry of one or more of the devices in FIG. 1) whether or not to select a scenario based on a creation date of value for scenario. For example, the system may determine whether or not the value (or data upon which the value was based) is too recent or too old. For example, the system may only select scenarios in which the value corresponds to a recent event. If process 300 determines not to select a scenario based on a creation date of value for scenario, process 300 proceeds to step 314. For example, the system may determine a first creation date of the first value.

If process 300 determines to select a scenario based on a creation date of value for scenario, the system proceeds to step 314 and determines whether or not the threshold is met. If the threshold is met, process 300 proceeds to step 316 and selects the scenario. If the threshold is not met, process 300 returns to step 302 and retrieves a different scenario. Alternatively, process 300 may select a default scenario. For example, the system may select a default scenario based on user settings (e.g., stored user questions) and/or based on available user data (e.g., values currently populated in the user profile). For example, the system may compare the first creation date to a threshold range of creation dates. In response to determining that the first creation date is within the threshold range of creation dates, the system may select the first scenario.

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one of more of the steps in FIG. 3.

Figure 4:
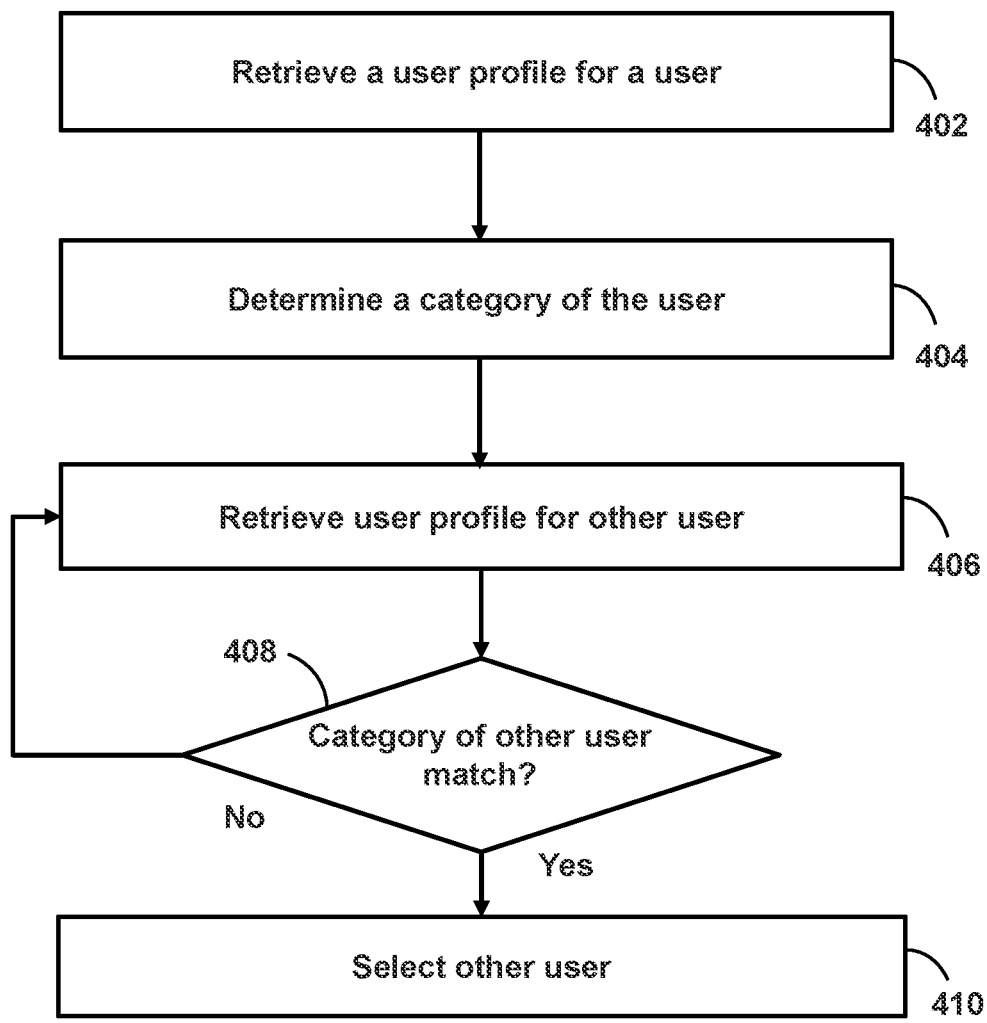
FIG. 4 shows a flowchart of the steps involved in selecting other users for use in contextual knowledge-based authentication, in accordance with one or more embodiments.

FIG. 4 shows a flowchart of the steps involved in selecting other users for use in contextual knowledge-based authentication, in accordance with one or more embodiments. For example, process 400 may represent the steps taken by one or more devices as shown in FIG. 1 when selecting a plurality of other users for use in generating a question for use in contextual knowledge-based authentication.

At step 402, process 400 retrieves (e.g., by control circuitry of one or more of the devices in FIG. 1) a user profile for a user. For example, in response to receiving a query for contextual knowledge-based authentication question, the system may retrieve a user profile for the user.

At step 404, process 400 determines (e.g., by control circuitry of one or more of the devices in FIG. 1) a category of the user. For example, in addition to containing contextual knowledge-based data about the user, the user profile may include one or more categories corresponding to the user. For example, the categories may include a geographic, demographic, and/or socioeconomic group of the user.

At step 406, process 400 retrieves (e.g., by control circuitry of one or more of the devices in FIG. 1) a user profile for another user. The system may then retrieve a user profile for another user. For example, as described above, the system may generate contextual knowledge-based authentication question based on information about other users (e.g., in order to determine a likelihood of a user value for a given scenario).

At step 408, process 400 determines (e.g., by control circuitry of one or more of the devices in FIG. 1) whether or not a category of the other user matches the category of the user. For example, the system may determine respective categories for each of the other users. If the category matches, the system may proceed to step 410. In contrast, if the category does not match, the system may return to step 406 and retrieve a user profile for a different user.

At step 410, process 400 selects (e.g., by control circuitry of one or more of the devices in FIG. 1) the other user. For example, the system selects the other users in response to determining that the respective categories of the other users match the category of the user. That is, the system may determine that users for which their information is used to generate contextual knowledge-based authentication questions for a given user are part of the same demographic, geographic, etc. group as the user.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one of more of the steps in FIG. 4.

Figure 5:
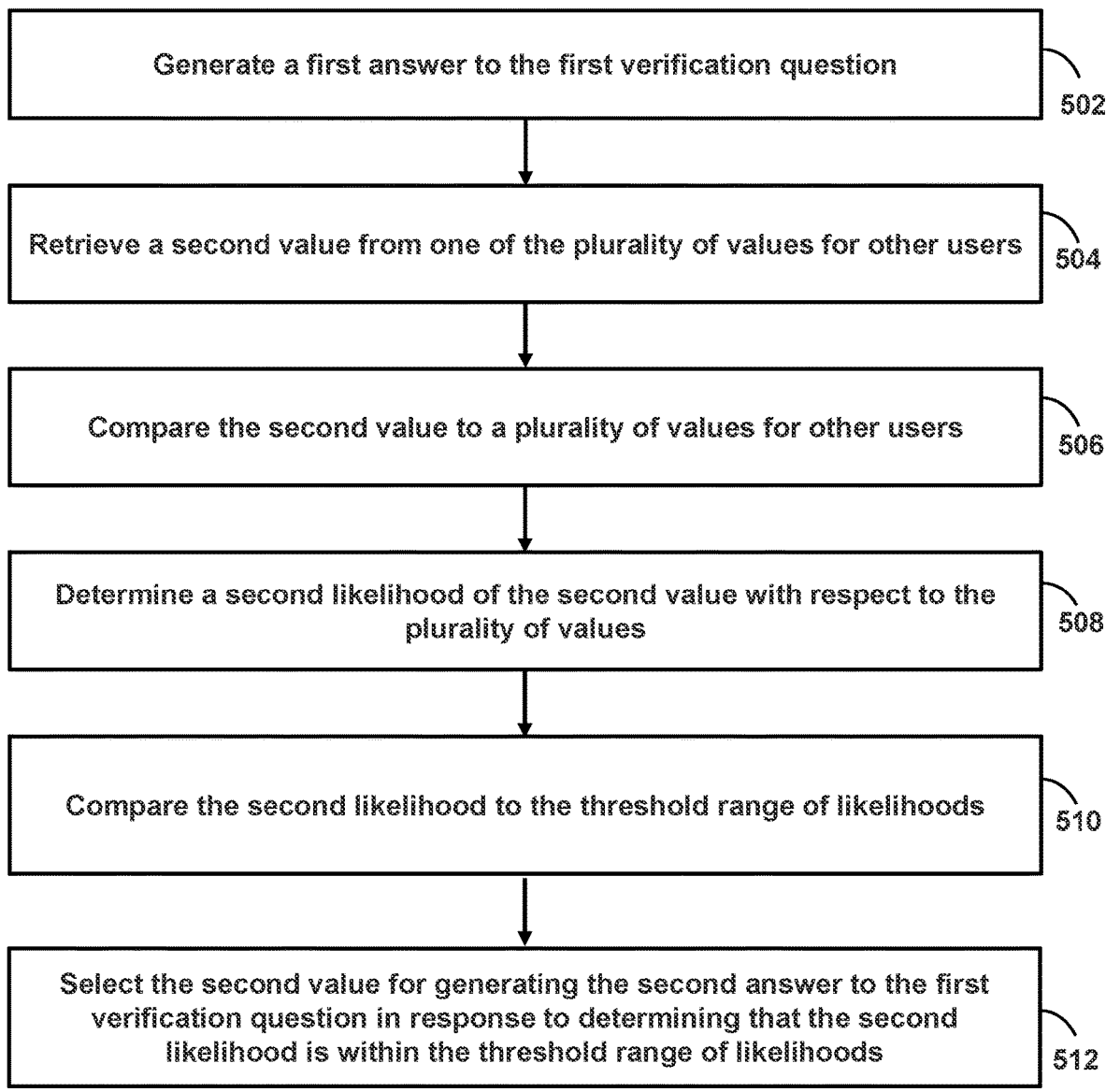
FIG. 5 shows a flowchart of the steps involved in generating a plurality of answers for use in contextual knowledge-based authentication, in accordance with one or more embodiments.

FIG. 5 shows a flowchart of the steps involved in generating a plurality of answers for use in contextual knowledge-based authentication, in accordance with one or more embodiments. For example, process 500 may represent the steps taken by one or more devices as shown in FIG. 1 when generating a plurality of answers for use in contextual knowledge-based authentication.

At step 502, process 500 generates (e.g., by control circuitry of one or more of the devices in FIG. 1) a first answer to the first verification question. For example, the system may generate a plurality of questions (e.g., question 114 and 118 (FIG. 1)). The system may generate a first answer to a first verification question, in which the first answer corresponds to the first value. The system may also generate a second answer to the first verification question, in which the second answer corresponds to a second value. The second value may correspond to a different scenario of the user, the same scenario of the user, and/or a different or same scenario of another user.

At step 504, process 500 retrieves (e.g., by control circuitry of one or more of the devices in FIG. 1) a second value for a second scenario from the user profile, wherein the second value represents a second behavior of the user in the second scenario. For example, in response to a query to verify an identity of a user through contextual knowledge-based authentication, the system may generate multiple questions. In parallel or in series to generating a first question, the system may generate a second question. The scenario of the question may be selected according to the processes described in FIG. 3 above.

At step 506, process 500 compares (e.g., by control circuitry of one or more of the devices in FIG. 1) the second value to a plurality of values for other users, wherein the plurality of values represents a respective behavior of each of the other users in the second scenario. For example, similar to comparing a value of a user for a first question to the other users, the system may compare the second value to the plurality of values for other users.

At step 508, process 500 determines (e.g., by control circuitry of one or more of the devices in FIG. 1) a second likelihood of the second value with respect to the plurality of values. For example, the system may determine a second likelihood for the second value. This second likelihood may be the same or different to the likelihood of other questions. In some embodiments, the system may generate questions in which the underlying likelihood varies. In some embodiments, the system may determine whether or not to generate additional questions based on an analysis of these underlying likelihoods.

For example, the system may combine the first likelihood and the second likelihood into a combined likelihood. The system may then compare the combined likelihood to a threshold combined likelihood. For example, the system may determine what the combined likelihood of the values underlying the first and second question in order to determine that the questions are not easily guessed by unauthorized users. In response to determining that the combined likelihood does not correspond to the threshold combined likelihood, the system may generate a third verification question.

At step 510, process 500 compares (e.g., by control circuitry of one or more of the devices in FIG. 1) the second likelihood to the threshold range of likelihoods. For example, the system may determine that the likelihood is within a minimum and/or maximum likelihood. For example, the system may determine a log likelihood or other probability statistic and ensure that the likelihood is within a certain percentage of probability (e.g., five, ten, or fifteen percent).

At step 512, process 500 generates (e.g., by control circuitry of one or more of the devices in FIG. 1) a second verification question for the user based on the second value in response to determining that the second likelihood is within the threshold range of likelihoods. For example, the system may generate a question (e.g., question 114 or 118) based on the second value.

In some embodiments, the system may determine a second answer (e.g., based on a second value) for the same question. For example, the system may retrieve a second value for a first scenario from the user profile, wherein the second value represents a second behavior of the user in the first scenario. The system may then rank the first value and the second value based on a respective number of occurrences in the first scenario, wherein the first verification question for the user is further based on a rank of the first value and the second value. For example, the system may use the determined ranks for a single question (e.g., a ranking question).

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

Exemplary Embodiments

1. A method of verifying an identity of a user through contextual knowledge-based authentication, the method comprising: retrieving, by control circuitry, a user profile for a user; retrieving, by the control circuitry, a first value for a first scenario from the user profile, wherein the first value represents a first behavior of the user in the first scenario; comparing, by the control circuitry, the first value to a plurality of values for other users, wherein the plurality of values represents a respective behavior of each of the other users in the first scenario; determining, by the control circuitry, a first likelihood of the first value with respect to the plurality of values; comparing, by the control circuitry, the first likelihood to a threshold range of likelihoods; and in response to determining that the first likelihood is within the threshold range of likelihoods, generating, by the control circuitry, a first verification question for the user based on the first value.

2. The method of embodiment 1, further comprising: determining a category of the user; determining respective categories for each of the other users; and selecting the other users in response to determining that the respective categories of the other users match the category of the user.

3. The method of embodiment 1 or 2, further comprising: retrieving respective user profiles for a plurality of other users; determining a number of the plurality of other users that have any stored value for the first scenario; comparing the number to a threshold number for the plurality of other; and in response to determining that the number is within the threshold number, selecting the first scenario.

4. The method of any one of embodiments 1-3, further comprising: determining a first creation date of the first value; comparing the first creation date to a threshold range of creation dates; in response to determining that the first creation date is within the threshold range of creation dates, selecting the first scenario.

5. The method of any one of embodiments 1-4, further comprising: retrieving respective user profiles for a plurality of other users; determining a number of different values stored for the plurality of other users for the first scenario; comparing the number to a threshold number for different values; and in response to determining that the number is within the threshold number, selecting the first scenario.

6. The method of any one of embodiments 1-5, wherein generating the first verification question for the user based on the first value comprises: generating a first answer to the first verification question, wherein the first answer corresponds to the first value; and generating a second answer to the first verification question, wherein the second answer corresponds to a second value.

7. The method of any one of embodiments 1-6, further comprising: retrieving a second value from one of the plurality of values for other users; determining a second likelihood of the second value with respect to the plurality of values; comparing the second likelihood to the threshold range of likelihoods; in response to determining that the second likelihood is within the threshold range of likelihoods, selecting the second value for generating the second answer to the first verification question.

8. The method of any one of embodiments 1-7, further comprising: retrieving a second value for a second scenario from the user profile, wherein the second value represents a second behavior of the user in the second scenario; comparing the second value to a plurality of values for other users, wherein the plurality of values represents a respective behavior of each of the other users in the second scenario; determining a second likelihood of the second value with respect to the plurality of values; comparing the second likelihood to the threshold range of likelihoods; and in response to determining that the second likelihood is within the threshold range of likelihoods, generating a second verification question for the user based on the second value.

9. The method of any one of embodiments 8, further comprising: combining the first likelihood and the second likelihood into a combined likelihood; comparing the combined likelihood to a threshold combined likelihood; and in response to determining that the combined likelihood does not correspond to the threshold combined likelihood, generating a third verification question.

0. The method of any one of embodiments 1-9, further comprising: retrieving a second value for a first scenario from the user profile, wherein the second value represents a second behavior of the user in the first scenario; and ranking the first value and the second value based on a respective number of occurrences in the first scenario, wherein the first verification question for the user is further based on the ranking.

10. The method of any one of embodiments 1-10, further comprising: receiving, from a remote device, a query to generate a first verification question for a user; and in response to the query, retrieving the user profile for a user.

12. The method of any one of embodiments 1-11, further comprising: transmitting the first verification question for display on the remote device; receiving, from the remote device, a user submission in response to the first verification question; and verifying the user submission based on the first value.

13. A tangible, non-transitory, machine-readable medium storing instructions that, when executed by a data processing apparatus, cause the data processing apparatus to perform operations comprising those of any of embodiments 1-12.

14. A system comprising: one or more processors; and memory storing instructions that, when executed by the processors, cause the processors to effectuate operations comprising those of any of embodiments 1-12.

15. A system comprising means for performing any of embodiments 1-12.

We claim:

1. A system for verifying an identity of a user through contextual knowledge-based authentication, the system comprising:
    memory configured to store a user profile and user profiles for a plurality of other users; and
    control circuitry configured to:
        receive, from a remote device, a query to generate a first verification question for a user;
        select a first scenario from (i) the user profile for the user and (ii) the user profiles for the plurality of the other users based on a number of the plurality of the other users having stored values for the first scenario being within a threshold number;
        determine a first likelihood, of a first value for the first scenario, with respect to a plurality of other values associated with other users in the first scenario, wherein (i) the first value represents a first behavior of the user in the first scenario, (ii) the first behavior of the user in the first scenario corresponds to a transaction of the user, (iii) the plurality of other values represents a respective behavior of the plurality of other users in the first scenario, and (iv) the respective behavior of the plurality of other users in the first scenario corresponds to a respective transaction of the plurality of other users;
        in response to the first likelihood being within a threshold range of likelihoods, generate the first verification question for the user based on the first value;
        determine a second likelihood, of a second value for a second scenario, with respect to a plurality of other values associated with the plurality of other users in the second scenario, wherein the second value represents a second behavior of the user in the second scenario, and wherein the plurality of other values associated with the plurality of other users in the second scenario represents a respective behavior of the other users in the second scenario;
        in response to the second likelihood being within the threshold range of likelihoods, generating a second verification question for the user based on the second value;
        in response to a combined likelihood of (i) the first likelihood and (ii) the second likelihood failing to correspond to a threshold combined likelihood, generating a third verification question; and
        transmitting the third verification question for display on the remote device.

2. The system of claim 1, wherein the control circuitry is further configured to:
    receive, from the remote device, a user submission in response to the third verification question; and
    verify the user submission based on a third value.

3. A method of verifying an identity of a user through contextual knowledge-based authentication on mobile devices, the method comprising:
    determining, at a mobile device, a first likelihood, of a first value for a first scenario, with respect to a plurality of other values associated with other users in the first scenario, wherein (i) the first value represents a first behavior of the user in the first scenario, and (ii) the plurality of other values represents a respective behavior of the other users in the first scenario;
    in response to the first likelihood being within a threshold range of likelihoods, generating, on a user interface of the mobile device, a first verification question for the user based on the first value;
    determining, at the mobile device, a second likelihood, of a second value for a second scenario, with respect to a plurality of other values associated with the other users in the second scenario, wherein the second value represents a second behavior of the user in the second scenario, and wherein the plurality of other values associated with the other users in the second scenario represents a respective behavior of the other users in the second scenario;
    in response to the second likelihood being within the threshold range of likelihoods, generating, on the user interface of the mobile device, a second verification question for the user based on the second value;
    in response to a combined likelihood of (i) the first likelihood and (ii) the second likelihood failing to correspond to a threshold combined likelihood, generating, on the user interface of the mobile device, a third verification question;
    receiving, from the mobile device, a user submission in response to the third verification question; and
    verifying the user submission based on a third value.

4. The method of claim 3, further comprising:
    determining a category of the user;
    determining respective categories for the other users; and
    selecting the other users in response to determining that the respective categories of the other users match the category of the user.

5. The method of claim 3, wherein the first scenario is selected based on determining a first creation date of the first value;
    comparing the first creation date to a threshold range of creation dates; and
    in response to determining that the first creation date is within the threshold range of creation dates, selecting the first scenario.

6. The method of claim 3, wherein the first scenario is selected based on retrieving respective user profiles for the other users;
    determining a number of different values stored for the other users for the first scenario; and
    comparing the number of different values to a threshold number of different values; and
    in response to determining that the number of different values is within the threshold number, selecting the first scenario.

7. The method of claim 3, wherein generating the first verification question for the user based on the first value comprises:
    generating a first answer to the first verification question, wherein the first answer corresponds to the first value; and generating a second answer to the first verification question, wherein the second answer corresponds to the second value.

8. The method of claim 7, wherein generating the second answer to the first verification question comprises:
retrieving the second value from one of the plurality of values for the other users; and
in response to the determination that the second likelihood is within the threshold range of likelihoods, selecting the second value for generating the second answer to the first verification question.

9. The method of claim 3, wherein the first scenario is selected based on selecting the first scenario from (i) a user profile for the user and (ii) user profiles for the other users based on a number of the other users having stored values for the first scenario being within a threshold number.

10. The method of claim 3, further comprising:
retrieving a second value for the first scenario from a user profile, wherein the second value represents a second behavior of the user in the first scenario; and
ranking the first value and the second value based on a respective number of occurrences in the first scenario, wherein the first verification question for the user is further based on a rank of the first value and the second value.

11. A non-transitory computer-readable media for verifying an identity of a user through contextual knowledge-based authentication comprising instructions that, when executed by one or more processors, cause operations comprising:
determining, at a mobile device, a first likelihood, of a first value for a first scenario, with respect to a plurality of other values associated with other users in the first scenario, wherein (i) the first value represents a first behavior of the user in the first scenario, and (ii) the plurality of other values represents a respective behavior of the other users in the first scenario;
in response to the first likelihood being within a threshold range of likelihoods, generating, on a user interface of the mobile device, a first verification question for the user based on the first value;
determining, at the mobile device, a second likelihood, of a second value for a second scenario, with respect to a plurality of other values associated with the other users in the second scenario, wherein the second value represents a second behavior of the user in the second scenario, and wherein the plurality of other values associated with the other users in the second scenario represents a respective behavior of the other users in the second scenario;
in response to the second likelihood being within the threshold range of likelihoods, generating, on the user interface of the mobile device, a second verification question for the user based on the second value;
in response to a combined likelihood of (i) the first likelihood and (ii) the second likelihood failing to correspond to a threshold combined likelihood, generating, on the user interface of the mobile device, a third verification question;
receiving, from the mobile device, a user submission in response to the third verification question; and
verifying the user submission based on a third value.

12. The non-transitory computer-readable media of claim 11, further comprising instructions that, when executed by the one or more processors, cause operations comprising:
determining a category of the user;
determining respective categories for the other users; and
selecting the other users in response to determining that the respective categories of the other users match the category of the user.

13. The non-transitory computer-readable media of claim 11, wherein the first scenario is selected based on determining a first creation date of the first value;
comparing the first creation date to a threshold range of creation dates; and
in response to determining that the first creation date is within the threshold range of creation dates, selecting the first scenario.

14. The non-transitory computer-readable media of claim 11, wherein the first scenario is selected based on determining a number of different values stored for the other users for the first scenario;
comparing the number of different values to a threshold number of different values; and
in response to determining that the number of different values is within the threshold number, selecting the first scenario.

15. The non-transitory computer-readable media of claim 11, wherein generating the first verification question for the user based on the first value comprises:
generating a first answer to the first verification question, wherein the first answer corresponds to the first value; and
generating a second answer to the first verification question, wherein the second answer corresponds to a second value.

16. The non-transitory computer-readable media of claim 15, wherein generating the second answer to the first verification question comprises:
retrieving the second value from one of the plurality of values for the other users; and
in response to the determination that the second likelihood is within the threshold range of likelihoods, selecting the second value for generating the second answer to the first verification question.

17. The non-transitory computer-readable media of claim 11, wherein the first scenario is selected based on selecting the first scenario from (i) a user profile for the user and (ii) user profiles for the other users based on a number of the other users having stored values for the first scenario being within a threshold number.

18. The non-transitory computer-readable media of claim 11, further comprising instructions that, when executed by the one or more processors, cause operations comprising:
retrieving a second value for the first scenario from a user profile, wherein the second value represents a second behavior of the user in the first scenario; and
ranking the first value and the second value based on a respective number of occurrences in the first scenario, wherein the first verification question for the user is further based on a rank of the first value and the second value.

* * * * *